United States Patent [19]

Landoll et al.

[11] 4,254,207

[45] Mar. 3, 1981

[54] PROCESS FOR PRODUCING SPHERICAL PARTICLES OR CRYSTALLINE POLYMERS

[75] Inventors: Leo M. Landoll, Wilmington; Walter S. Ropp, Hockessin, both of Del.

[73] Assignee: Hercules Incorporated, Wilmington, Del.

[21] Appl. No.: 107,471

[22] Filed: Dec. 26, 1979

[51] Int. Cl.³ .................... C08L 67/06; C08L 77/00; G03G 9/00
[52] U.S. Cl. ............................ 430/137; 260/37 R; 260/37 M; 260/37 N; 260/40 R; 260/42.14; 260/42.16; 260/42.22; 430/109; 525/176; 525/183
[58] Field of Search ............... 260/37 R, 37 L, 37 M, 260/40 R, 42.14, 42.16, 42.22; 525/176, 183; 430/109, 137

[56] References Cited

U.S. PATENT DOCUMENTS

| | | | |
|---|---|---|---|
| 3,435,093 | 3/1969 | Cope | 525/176 |
| 3,586,654 | 6/1971 | Lerman et al. | 430/137 |
| 3,669,922 | 6/1972 | Bartsch et al. | 430/137 |
| 3,674,736 | 7/1972 | Lerman et al. | 430/137 |
| 3,910,846 | 10/1975 | Azar et al. | 430/137 |

*Primary Examiner*—J. Ziegler
*Attorney, Agent, or Firm*—Hazel L. Deming

[57] ABSTRACT

A process for producing uniformly small spherical particles of crystalline, normally solid condensation polymers is described. The process of this invention further provides high yields of hydrophobic, non-agglomerating particles in a useful size range directly, without the need for subsequent processing, and is carried out by forming a dispersion of small liquid particles of the crystalline polymer in certain aprotic liquids containing 0.1 to 20% by weight of the polymer of an acid-modified polymer of propylene in a specified manner, cooling the dispersion with agitation until the liquid particles solidify and recovering the particles.

12 Claims, No Drawings

PROCESS FOR PRODUCING SPHERICAL PARTICLES OR CRYSTALLINE POLYMERS

This invention relates to the art of preparing small, spherical particles of polymeric materials and more particularly to a process for producing particles of crystalline condensation-type polymers in the form of small, hydrophobic, non-agglomerating spheres.

Crystalline polymers, and particularly condensation-type polymers such as the polyesters and polyamides, possess a unique combination of properties which makes them ideal candidates for coating applications. For many of these applications it is also advantageous to have the polymer in the form of relatively small, uniform spherical particles. This is particularly the case when the intended use is as a fusion coating to be applied in the solid state, as, e.g., by fluid bed techniques.

The preparation of small particles of solid, crystalline condensation polymers has always been something of a challenge to the polymer chemist. The ideal technique would be to develop a method of direct polymerization to the desired particle size. This has not been possible, however, except in a few isolated instances. Therefore, the processes generally employed have involved either comminution, spray drying or dispersion techniques.

Comminution, as by grinding, is difficult and expensive and results in highly irregular shaped particles having a broad distribution range which must be narrowed by extensive classification to control coating performance. The technique of grinding and classification also results in large quantities of off-size material which must be either reprocessed or discarded and this is commercially unattractive.

Spray drying processes which have been developed usually provide significant improvement in particle shape and size uniformity over the grinding technique. Conventionally, spray drying processes involve atomizing a solution or emulsion containing the polymer into droplets, mixing the droplets with a gas and holding the droplets in suspension in the gas until evaporation drives off the liquid, and heat and surface tension cause the polymer particles in the droplets to coalesce. In the case of crystalline polyesters which are not soluble in water, relatively large amounts of organic polar solvents such as the halogen-containing hydrocarbons or mixtures thereof with alcohols such as isopropyl alcohol, glycol monoethylether or phenol, must be used to provide solutions of a sprayable consistency. The use of chlorinated solvents is undesirable from the standpoint of toxicity and expense. Further, the spray dried particles tend to be porous or to contain strings and hollow shells which must be removed.

While many polymers can be formed directly into latices by emulsion polymerization, the condensation polymers such as the polyesters do not fall into that category and are emulsified by precipitating a solution of the polymer from a water-immiscible solvent into water in the presence of an emulsifying agent or, in the case of polyesters having an acid value of at least 0.02 and a melt viscosity of about 300 poises or less, by admixing under high shear a melt of the polyester with an aqueous basic solution, likewise in the presence of an emulsifying agent, as for example, according to the procedure of U.S. Pat. No. 3,910,846. Recovery of small particles of solid polymer from oil-in-water emulsions by spray drying is not satisfactory when the polymer is a polyester due to the tendency of the particles to agglomerate during the solvent stripping operation. The use of a second water-immiscible organic liquid which is miscible with the first solvent and is a non-solvent for the polymer has also been suggested for breaking the oil-in-water emulsions. While the latter method avoids to a large extent the agglomeration problems associated with solvent stripping, the resulting particles are water-sensitive due to the presence of the inherently polar emulsifier required for forming the initial oil-in-water emulsion. Removal of the emulsifier is difficult, if not impossible, and the process is not satisfactory for many applications.

Dispersion processes which have been proposed for the formation of spherical particles of polymeric materials are described, for example, in U.S. Pat. Nos. 3,586,654, 3,669,922 and 3,674,736. Typically, these processes involve heating the polymer to a temperature above its melting point in an inert liquid in the presence of a nonionic dispersing agent of the polyoxyalkylene glycol type using high shear agitation to form a dispersion with the polymer in finely divided form, after which the dispersion is cooled to below the melting point of the polymer to harden the particles. Water is the usual liquid and processing conditions must be carefully selected and precisely controlled to regulate particle uniformity and provide particles of a desired shape, size and size distribution. Although these processes are said to be applicable to any type of thermoplastic polymer, it has been found that the polyesters cannot be processed in the manner of most polymers due to the inherent tendency of molten polyesters to hydrolyze in the presence of water, as well as the strong tendency of the particles to coalesce and agglomerate. In fact, not only must very strick controls on processing parameters and particularly, concentration, temperature and agitation conditions be maintained to obtain particles in a practical size range, but even then the yields are completely inadequate from a commercial standpoint and the particles are of limited utility due to their moisture sensitivity.

Now in accordance with this invention, it has been found that uniformly small spherical particles of crystalline, normally solid condensation-type polymers can be produced by a process which avoids many of the problems encountered in the above-mentioned prior art methods and provides directly, in high yields, hydrophobic, non-agglomerating particles in a useful size range without the need for strict processing controls, or subsequent processing as by grinding and/or classification. More particularly, the process of this invention comprises the steps of agitating, under conditions of shear, a fluid mixture of a crystalline, normally solid condensation-type polymer in an aprotic liquid which is a non-solvent for the polymer and which contains dissolved or dispersed therein from 0.1 to 20% based on the weight of the polymer of an acid-modified polymer of propylene at a temperature above the crystalline melting point of the condensation-type polymer until a dispersion of small liquid particles is formed, agitating the dispersion while cooling to a temperature below the crystalline melting point of the condensation-type polymer until the liquid particles solidify, and recovering the resulting particles from the aprotic liquid.

The crystalline, condensation-type polymers which are used to form the spherical particles of this invention are polyesters or polyamides which have a degree of crystallinity above 20% and preferably from about 25 to about 80%. The polyesters can be homopolyesters, copolyesters or terpolyesters and contain a series of predominantly carbon atom chains joined by recurring carbonyloxy radicals

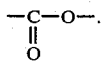

Preferred are the crystalline linear homopolyesters or copolyesters having a melting point of at least about 40° C., and most preferably from about 50° to about 150° C., and a reduced specific viscosity (RSV) of at least about 0.15 dl/g ($\eta sp/c$, as determined on a solution of 0.5 gram of the polyester in 100 cc. of chloroform at 30° C.), and particularly the polyesters prepared from aliphatic and/or aromatic dicarboxylic acids or ester-forming derivatives thereof and one or more difunctional alcohols, for example, ethylene glycol, trimethylene glycol, 1,4-butanediol, neopentyl glycol, hexamethylene glycol, decamethylene glycol, eicosamethylene glycol, and similar diols. Typical dicarboxylic acids include the aromatic dicarboxylic acids such as phthalic acid, isophthalic acid and terephthalic acid and aliphatic dicarboxylic acids such as oxalic, malonic, succinic, adipic, suberic, azelaic, sebacic, dodecanedioic, octadecanedioic, and the like. Preferred are the crystalline aliphatic polyesters of an aliphatic diol having 2 to 20 carbon atoms and aliphatic dicarboxylic acids having 2 to 18 carbon atoms, and particularly those aliphatic polyesters having a melt viscosity at 20° C. above the crystalline melting point, of at least about 500 poises and most preferably from about 1000 to 10,000 poises.

The crystalline polyamides are linear homopolyamides or copolyamides prepared by the polymerization of diamines and dibasic acids or polyamide-forming functional derivatives of these acids. As examples of suitable diamines are the straight chain polymethylene aliphatic diamines of the general formula $H_2N(CH_2)_nNH_2$, where n is not less than 2 and not greater than 20; branched chain aliphatic diamines such as 2,2,4-trimethyl hexamethylene diamine; ether diamines such as 3,3'-bis(aminopropyl)ether and ethylene bis(3-3-aminopropyl)ether; cycloaliphatic diamines such as 1,4-bis(aminomethyl) cyclohexane and bis(4-aminocyclohexyl) methane; aryl aliphatic diamines such as m-xylylene diamine and p-xylylene diamine; and heterocyclic diamines such as 2-piperazine. The above diamines may be condensed singly or in various combinations as appropriate and familiar to those skilled in the art with straight chain polymethylene dicarboxylic acids (or their polyamide-forming functional derivatives) of the general formula $(ROOC(CH_2)_mCOOR$, where each R is hydrogen (or a functional group) and m is a positive integer not greater than 20; with branched chain aliphatic dicarboxylic acids, for example, 2-methyl butane-1,4-dicarboxylic acid; with cycloaliphatic dicarboxylic acids, for example, cyclohexane-1,4-dicarboxylic acid; with aromatic dicarboxylic acids, for example, terephthalic acid, isophthalic acid, 1,5-dimethyl terephthalic acid, naphthalene-1,4-dicarboxylic acid, and benzophenone-2,4'-dicarboxylic acid; with arylaliphatic dicarboxylic acids, for example, 2,5-dimethyl-p-phenylene diacetic acid, 2,2-bis(p-carboxymethoxyphenyl) propane and bis(p-carboxy-methyl phenyl) ether; and with heterocyclic dicarboxylic acids, for example, furan 2,5-di($\beta$-propionic acid); and with mixtures of any of the above acids. Polyamides and copolyamides may also be prepared from ω-amino acids or the derived cyclic lactams, used either alone or in combination with the above diacids and diamines in appropriate stoichiometric balance, for example, ε-aminocaproic acid, caprolactam, ω-aminodecanoic acid, ω-aminoundecanoic acid, ω-aminododecanoic acid, 7-heptanolactam and 8-octanolactam. The preferred polyamides have crystalline melting points above about 100° C., a reduced specific viscosity (RSV) of at least about 0.2 and preferably at least about 0.4 ($\eta sp/c$, as determined on a 0.1% solution in butanol at 30° C.) and a melt viscosity at 20° C. above the crystalline melting point of at least about 500 poises and preferably from about 1000 to 10,000 poises. Particularly suitable are the polyamides available commercially under the designation Nylon 11 and Nylon 12.

Other ingredients such as heat and light stabilizers, antioxidants, antistatic agents, viscosity improvers, mold release agents, flame retardants, pigments, fillers, extenders, additives to control electrical and magnetic properties, and the like can also be present in amounts which do not detract from the advantages of the invention. Such ingredients can be incorporated as an additive to the fluid mixture or can be an ingredient of the condensation-type polymer. Usually, and particularly when the additive is pigmentary, it is advantageous to introduce the additive into one of the reactants prior to or during the condensation reaction. Particularly useful pigments, in addition to the conventional organic and inorganic colorants, are the conductive and non-conductive carbon blacks, generally present in a concentration ranging from about 5 to about 20% by weight of the product and the magnetic iron oxides in amounts up to about 70% and preferably about 30 to about 65% by weight of the product.

In carrying out the process of this invention a mixture of the condensation polymer in an aprotic liquid which is a non-solvent for the polymer is agitated under conditions of shear in the presence of 0.1 to 20%, and preferably from 0.5 to 10%, based on the condensation polymer of an acid-modified polymer of propylene at a temperature which is above the melting point of the condensation polymer. By the term "acid-modified polymer of propylene" or, for the sake of brevity, "modified polypropylene" is meant a propylene-containing polymer that has been chemically modified with an ethylenically unsaturated organic acid or acid anhydride. The modified propylene polymer of the instant invention can be any solid polymer of propylene or copolymer thereof with another 1-olefin, which has been chemically modified by reaction with an ethylenically unsaturated carboxylic acid or anhydride. Homopolymers of propylene exist in both the amorphous and crystalline form (the latter sometimes called isotactic or stereoregular polypropylene) and either of these homopolymers of propylene can be modified for use in this invention. Likewise, propylene can be copolymerized with ethylene, 1-butene and/or another 1-olefin to yield amorphous or crystalline copolymers. Typical copolymers in addition to those prepared with ethylene are those prepared with 1-butene and the terpolymers prepared from propylene, ethylene and a diene such as dicyclopentadiene. Any of these can likewise be used.

The modification of the polymer of propylene is effected with an ethylenically unsaturated carboxylic acid or an anhydride, which has its ethylenic unsaturation on a carbon atom in a position alpha to the carboxyl group or anhydride. Examples of such acids and anhydrides include maleic acid, fumaric acid, itaconic acid, citraconic acid, acrylic acid, methacrylic acid, crotonic acid, isocrotonic acid, mesaconic acid, angelic acid, maleic anhydride, citraconic anhydride, and itaconic anhydride. The most preferred modifiers are maleic anhydride and acrylic acid.

The modified polypropylenes are prepared by treating the propylene polymer to produce on the polymer chain active sites or centers at which the modifying compound can anchor through its double bond. Such active centers can readily be induced in known ways as, for example, by subjecting the polymer to the action of high energy ionizing radiations such as gamma rays, X-rays, or high speed electrons, or by contacting the polymer, either as a solid or dissolved in a solvent, with a free radical producing material such as a peroxide. Preferably, the modified polypropylene is prepared by reacting the unsaturated carboxylic acid or anhydride with a solution of the propylene polymer in an organic solvent containing a free radical producing material, such method being described in Belgian Pat. No. 607,269.

The modified polypropylenes used in this invention preferably contain the unsaturated acid or anhydride in a quantity sufficient to provide from about 0.15 to 10.0% and more preferably from about 0.3 to 6% of actual or potential carboxyl group by weight of the modified polypropylene. As an example of calculating the weight percent of actual or potential carboxyl groups present in the modified polypropylene, the addition of 1 part of maleic anhydride to 99 parts of base polymer is calculated to result in a modified polymer containing 0.908% potential carboxyl group, as follows:

$$1\% \times \frac{90 \text{ (molecular weight of 2 COOH groups)}}{98 \text{ (molecular weight of maleic anhydride)}} = 0.908$$

Restated in terms of weight percent of chemically combined unsaturated acid or anhydride, the preferred modified polypropylenes contain from about 0.17 to about 11% and preferably 0.33 to 6.6% of maleic anhydride or from about 0.24 to about 16% and preferably from 0.48 to 9.6% of acrylic acid.

The preferred modified propylene polymers have a reduced specific viscosity (RSV) of about 0.1 to 5 dl/g and more preferably, from about 0.3 to 3.5 dl/g ($sp/c$, as determined on a 0.1% solution of the polymer in decahydronaphthalene at 135° C.). Optimum viscosity levels within these ranges are easily determined for a specific polymer by experimentation.

As stated, the process of this invention is carried out using an aprotic liquid diluent which is a non-solvent for the crystalline condensation-type polymer. Non-solvents of this type are normally liquid hydrocarbons which are volatile at a temperature which is at least as high as the melting point of the polymer. Preferred diluents include the aliphatic and aromatic hydrocarbons containing about 5 to about 10 carbon atoms and particularly paraffinic hydrocarbon mixtures and the aromatic hydrocarbons such as benzene, toluene, ethyl benzene, xylene and the like. Mixtures of any of the above diluents can be used.

The amount of diluent used is not critical and is largely a matter of choice and convenience, the practical requirement being that sufficient diluent is present to provide fluidity and ease of agitation. Generally, the ratio of diluent to polymer will range from about 2:1 to about 50:1, and preferably from about 4:1 to about 20:1. Amounts of diluent above 50:1 are not harmful but usually impractical due to the expense and time involved to remove and recover the organic diluent.

In the first step of the process of this invention, the fluid mixture of condensation-type polymer, aprotic liquid and acid-modified polymer of propylene is agitated under conditions of shear at a temperature above the melting point of the condensation-type polymer until a dispersion of small liquid particles is formed. This step of the process can be carried out in any suitable apparatus such as a tank fitted with a suitable agitator, heating means and condenser, as needed, to bring the polymer to a point of fluidity and maintain the diluent in the liquid stage. Agitation under conditions of shear is necessary to subdivide the condensation-type polymer as it becomes molten and to form a dispersion of the small liquid particles. The shear requirement can be effected via high speed agitation, e.g., a high shear mixer. Any type of mixing or agitation apparatus which is capable of forming a dispersion of the fluid particles and maintaining the particles in a highly dispersed state will meet this objective. Generally, the level of agitation will be selected and controlled to provide a dispersion of liquid particles in a size within the range of about 1 to 300 microns and preferably about 5 to 100 microns.

Following the formation of the dispersion of the small liquid particles, the dispersion is cooled to a temperature below the crystalline melting point of the condensation-type polymer and agitation is continued until the particles solidify. High shear agitation is neither necessary nor desirable at this stage and the only requirement is that sufficient agitation be employed while the dispersed polymer is in a molten state to avoid settling and/or reagglomeration of the dispersed particles. A convenient technique for carrying out this step of the process involves passing the hot dispersion through a homogenizer directly into a cooling vessel equipped with a slow stirrer and continuing stirring until the particles solidify. Following solidification, the particles can be recovered conventionally, as by filtration, decantation, centrifugation or any other convenient separation technique, and then can be washed and dried.

The particles produced by the process of this invention are non-agglomerating spheres having diameters ranging from about 1 to about 300, preferably about 5 to about 100 microns. The particles pack better than do irregularly shaped particles, are easily fluidized and, upon application to a heated substrate, lead to uniform coatings. Pigmented particles are substantially uniform in composition and provide a complete solid coating system without further compounding. The pigmented particles are particularly useful as toners in electrostatic printing and copying systems. The toners do not block under ambient operating conditions, melt sharply near the minimum fusion temperature which is a practical low temperature to avoid excessively high energy consumption and possible heat damage to the copy substrate or machine parts and have an acceptable viscosity over a wide fusion range, thus providing a high degree of flexibility in electrostatographic copying processes.

Having described the invention generally, the following examples are given to illustrate specific embodiments thereof. All parts and percentages are by weight unless otherwise indicated.

EXAMPLE 1

A pigmented crystalline poly(butylene adipate) containing 6% of carbon black was prepared by heating the following ingredients in the ratios given at 160° to 180° C. until the desired viscosity was reached, the carbon black having been predispersed in the 1,4-butanediol.

| Ingredients | Parts |
|---|---|
| 1,4-butanediol | 639 |
| carbon black (Raven 420) | 83 |
| adipic acid | 1036 |
| tetrabutyl titanate catalyst | 10 |

The poly(butylene adipate) had a reduced specific viscosity of 0.25 dl/g, a weight average molecular weight of 16,000, a crystalline melting point of 58°–60° C., a degree of crystallinity of about 50% and a melt viscosity of 4000 poises at 80° C.

A stainless steel vessel equipped with a variable speed, high shear agitator was charged with a solution of 5 parts of maleic anhydride-modified amorphous polypropylene having a carboxyl content of 1.3%, a reduced specific viscosity of 1.2 dl/g and a weight average molecular weight of 120,000, in 200 parts of n-heptane and 50 parts of the pigmented crystalline poly(butylene adipate) produced above, and the vessel was placed in an oil bath at 85° C. Agitation was commenced, the speed of the agitator was adjusted to 3000–5000 r.p.m. when the polymer became molten and agitation was continued for 5 minutes, following which time the vessel was removed from the bath and the charge was agitated at 100 r.p.m. until the temperature of the charge was reduced to 45° C. The resulting slurry was then centrifuged and 48 parts of black spherical particles were recovered. Characterization of the particles by Coulter Counter volume % analysis showed that 16% had a particle size less than 12 microns, 50% had a size less than 23.5 microns, and 84% had a size less than 35 microns.

For the sake of comparison, the above procedure was repeated with the exception that no maleic anhydride modified amorphous polypropylene was used. The recovered product was a stringy mass of large, irregularly shaped agglomerates.

EXAMPLE 2

The procedure of Example 1 was repeated except that the amount of maleic anhydride-modified amorphous polypropylene was reduced to 0.6 part. The particles of this example were spherical and had a median size of 60 microns.

EXAMPLE 3

The procedure of Example 1 was repeated except that an equal amount of an acrylic acid modified amorphous polypropylene having a carboxyl content of 3.1%, a reduced specific viscosity of 0.8 dl/g and a weight average molecular weight of 55,000 was substituted for the maleic anhydride-modified amorphous polypropylene of Example 1, and 200 parts of a paraffinic hydrocarbon diluent having a boiling point range of 162° to 177° C. (Isopar H) was substituted for the 200 parts of n-heptane. The product was 49 parts of spherical particles of which 40% by volume had a size less than 38 microns.

EXAMPLE 4

The procedure of Example 1 was repeated except that the vessel was charged with a solution of 3 parts of a maleic anhydride-modified amorphous polypropylene having a carboxyl content of 5.5%, a reduced specific viscosity of 0.5 dl/g and a weight average molecular weight of 35,000 in 200 parts of a mixture of aliphatic hydrocarbons having a boiling point range of 162° to 177° C. and 30 parts of the pigmented crystalline poly(butylene adipate) of Example 1, and the oil bath temperature was 130° C. The product was 28 parts of spherical particles of which 70% by volume had a size less than 44 microns.

EXAMPLE 5

The procedure of Example 1 was repeated except that 50 parts of a pigmented crystalline poly(butylene sebacate) containing 6% carbon black was substituted for the pigmented crystalline poly(butylene adipate). The pigmented crystalline poly(butylene sebacate) was prepared by heating the following ingredients in the ratios given at 180° C. until the desired viscosity was reached, the carbon black having been predispersed in the 1,4-butenediol.

| Ingredients | Parts |
|---|---|
| 1,4-butanediol | 180.2 |
| sebacic acid | 404.5 |
| carbon black (Raven 420) | 35.0 |
| tetrabutyl titanate catalyst | 3.4 |

The poly(butylene sebacate) had a reduced specific viscosity of 0.44 dl/g, a weight average molecular weight of 31,900, a crystalline melting point of 64° C., a degree of crystallinity of about 55% and a melt viscosity of 2500 poises at 84° C.

The product of this example was 48 parts of spherical particles, of which 50% by volume had a particle size less than 25 microns.

EXAMPLE 6

The procedure of Example 5 was repeated except that a pigmented crystalline poly(hexamethylene sebacate) containing 6% carbon black was substituted for the poly(butylene sebacate). The crystalline polymer used in this example was prepared by heating the following ingredients in the ratios given at 180° C. until the desired viscosity was reached, the carbon black having been predispersed in the 1,6-hexanediol.

| Ingredients | Parts |
|---|---|
| 1,6-hexanediol | 177.2 |
| sebacic acid | 303.4 |
| carbon black (Raven 420) | 22.0 |
| tetrabutyl titanate catalyst | 3.4 |

The poly(hexamethylene sebacate) had a reduced specific viscosity of 0.32 dl/g, a weight average molecular weight of 20,500, a crystalline melting point of 67° C., a degree of crystallinity of about 55% and a melt viscosity of 8,000 poises at 87° C.

The product of this example was 48.5 parts of spherical particles, of which 50% by volume had a particle size less than 20 microns.

EXAMPLE 7

The procedure of Example 5 was repeated except that a pigmented crystalline poly(hexamethylene adipate) containing 6% carbon black was substituted for the poly(butylene sebacate). The crystalline polymer used in this example was prepared by heating the following ingredients in the ratios given at 180° C. until the desired viscosity was reached, the carbon black having been predispersed in the 1,6-hexanediol.

| Ingredients | Parts |
|---|---|
| 1,6-hexanediol | 236.3 |
| adipic acid | 292.3 |
| carbon black (Raven 420) | 30.0 |
| tetrabutyl titanate catalyst | 3.4 |

The poly(hexamethylene adipate) had a reduced specific viscosity of 0.37 dl/g, a weight average molecular weight of 25,300, a crystalline melting point of 60° C., a degree of crystallinity of about 45% and a melt viscosity of 1,000 poises at 80° C.

The product of this example was 17.5 parts of spherical particles, of which 50% by volume had a particle size less than 18 microns.

EXAMPLE 8

A crystalline poly(butylene adipate) containing 15% carbon black was prepared as in Example 1 except that 207 parts of Regal 440 were substituted for the 83 parts of Raven 420.

A stainless steel vessel equipped with a simple stirrer was charged with a solution of 5 parts of the maleic anhydride-modified amorphous polypropylene of Example 1 in 200 parts of n-heptane and 50 parts of the 15% pigmented crystalline poly(butylene adipate), the vessel was placed in an oil bath at 90° C. and stirring was commenced when the polymer became molten. The resulting dispersion was next fed through a homogenizer into a second vessel equipped with a stirrer and stirring was continued until the temperature was reduced to room temperature. The product recovered by centrifugation was black spherical particles, of which 50% by volume had a diameter less than 11 microns.

EXAMPLE 9

The procedure of Example 1 was repeated except that the crystalline poly(butylene adipate) was not pigmented, i.e., no carbon black was used. The product of this example was 48 parts of spherical particles, of which 50% by volume had a diameter less than 19 microns.

EXAMPLE 10

The procedure of Example 1 was repeated except that 5 parts of maleic-modified crystalline polypropylene having a carboxyl content of 2.8% and a reduced specific viscosity of 0.5 dl/g was substituted for the maleic anhydride-modified amorphous polypropylene of Example 1 and 200 parts of decahydronaphthalene were substituted for the n-heptane. The polymer particles of this example were spherical and 50% by volume had a diameter less than 15 microns.

EXAMPLE 11

The procedure of Example 1 was repeated except that 5 parts of maleic anhydride-modified poly(propylene coethylene) containing 8% ethylene and having a carboxyl content of 0.45% and a reduced specific viscosity of 2.0 dl/g was substituted for the maleic anhydride-modified amorphous polypropylene of Example 1. The polymer particles of this example were spherical and 50% by volume had a particle diameter of less than 22 microns.

EXAMPLE 12

A stainless steel vessel equipped with a variable speed high shear agitator was charged with a solution of 5 parts of the maleic anhydride-modified amorphous polypropylene of Example 1 in 200 parts of a largely paraffinic oil with an initial boiling point of 345° C. (Magie 590) and 50 parts of a pigmented crystalline polyamide produced by melt compounding 85 parts of poly(ω-aminoundecanoic acid) having a reduced specific viscosity of 0.25 dl/g, a weight average molecular weight of 15,000, a crystalline melting point of 186° C., a melt viscosity of 5000 poises at 206° C., and a degree of crystallinity of about 25% with 15 parts of a copper phthalocyanine blue pigment. The vessel was placed in an oil bath at 200° C., agitation was commenced and the speed of the agitator was increased to 10,000 r.p.m. when the polyamide became molten. Agitation was continued for 10 minutes following which the vessel was removed from the bath and the charge was agitated at 300 r.p.m. until the temperature was reduced to 165° C. The resulting slurry was then centrifuged and the product was 48 parts of blue spherical particles, 50% by volume of which had a size less than 15 microns.

EXAMPLE 13

An agitator-equipped vessel was charged with 600 parts by volume of a mixture of aliphatic hydrocarbons having a boiling point range of 208° to 250° C. containing 0.6 part of the maleic anhydride-modified amorphous polypropylene of Example 4 and 20 parts of a crystalline pol(butylene adipate) containing 15% carbon black and having a reduced specific viscosity of 0.25 dl/g, a weight average molecular weight of 16,000, a crystalline melting point of 58°–60° C., a degree of crystallinity of about 50% and a melt viscosity of 4000 poises at 80° C. The vessel was placed in an oil bath at 130° C., agitation was commenced, the speed of the agitator was adjusted to 10,000 r.p.m. when the polymer became molten and agitation was continued for 20 minutes, following which time the vessel was removed from the bath and the charge was agitated at 1000 r.p.m. until the temperature of the charge was reduced to 20° C. The resulting slurry was centrifuged and 19.5 parts of black spherical particles, 90% by volume of which had a particle size less than 30 microns, were recovered.

COMPARATIVE EXAMPLE

The procedure of Example 13 was repeated except that in this comparative example 20 parts of an amorphous polyester containing 15% of carbon black were substituted for the pigmented crystalline poly(butylene adipate). The amorphous polyester used in this comparison had a weight average molecular weight of 16,000, a glass transition temperature of 50° C. and a melt viscosity of 4,000 poises at 130° C. and was produced by reacting 1 mole of maleic anhydride with a precondensate of 1 mole of bisphenol A and 2 moles of propylene glycol at 220° C. for 3 hours. Prior to removing the vessel from the oil bath, it appeared that a dispersion of small liquid particles had been formed. However, as the dispersion was cooled to below the glass transition temperature of the polyester, the amorphous polyester solidified into large irregular globs and no spherical particles were obtained.

EXAMPLE 14

A crystalline poly(butylene adipate) containing 50% of magnetic iron oxide was prepared according to the first paragraph of Example 1 except that 1657 parts of magnetite having a mean particle diameter between 0.15 and 0.30 micron were substituted for the 83 parts of Raven 420 carbon black.

A glass vessel equipped with a variable speed, high shear agitator was charged with a solution of 3 parts of the maleic anhydride-modified amorphous polypropylene of Example 1 in 300 parts of n-heptane and 100 parts of the 50% magnetic iron oxide pigmented crystalline poly(butylene adipate). The vessel was steam heated to 90° C. with moderate agitation and when the polymer became molten, the agitator speed was increased to 10,000 r.p.m. and agitation was continued for about seven minutes. Next, the agitator speed was adjusted to 250 r.p.m. and agitation was continued until the temperature of the charge was reduced to room temperature. The product recovered by centrifugation of the resulting dispersion was black spherical particles, of which 50% by volume had a diameter less than 46 microns.

What we claim and desire to protect by Letters Patent is:

1. A process for producing spherical small particles of crystalline, normally solid condensation-type polymers which process comprises agitating under conditions of shear a fluid mixture of said polymer in an aprotic liquid which is a non-solvent for said polymer and which contains dissolved or dispersed therein from 0.1 to 20%, based on the weight of said polymer, of an acid-modified polymer of propylene at a temperature above the crystalline melting point of the condensation-type polymer until a dispersion of small liquid particles is formed, agitating the dispersion while cooling to a temperature below the crystalline melting point of the condensation-type polymer until the liquid particles solidify, and recovering the resulting particles from the aprotic liquid.

2. The process of claim 1 wherein the crystalline condensation-type polymer is a polyester.

3. The process of claim 2 wherein the polyester is an aliphatic polyester.

4. The process of claim 3 wherein the polyester is pigmented.

5. The process of claim 4 in which the pigment is carbon black.

6. The process of claim 4 in which the pigment is magnetic iron oxide.

7. The process of claim 4 wherein the acid modified polymer of propylene is amorphous.

8. The process of claim 7 wherein the carboxyl content of the acid-modified polymer of propylene ranges from 0.15 to 10% by weight of the modified polymer.

9. The process of claim 8 wherein the acid-modified polymer of propylene is maleic anhydride-modified polypropylene.

10. The process of claim 9 wherein the polyester is poly(butylene adipate).

11. The process of claim 8 wherein the acid-modified polymer of propylene is acrylic acid-modified polypropylene.

12. The process of claim 11 wherein the polyester is poly(butylene adipate).

* * * * *

UNITED STATES PATENT AND TRADEMARK OFFICE
CERTIFICATE OF CORRECTION

PATENT NO. : 4,254,207
DATED : March 3, 1981
INVENTOR(S) : Leo M. Landoll & Walter S. Ropp It is certified that error appears in the above-identified patent and that said Letters Patent are hereby corrected as shown below:

The formal title on the cover sheet and first page of the patent under Column 1 is incorrect, "Process For Producing Spherical Particles Or Crystalline Polymers" should read -- Process For Producing Spherical Particles Of Crystalline Polymers --.

Signed and Sealed this

Twenty-sixth Day of May 1981

[SEAL]

Attest:

RENE D. TEGTMEYER

Attesting Officer

Acting Commissioner of Patents and Trademarks